US012601674B2

(12) United States Patent
    Pollak

(10) Patent No.: US 12,601,674 B2
(45) Date of Patent: Apr. 14, 2026

(54) PROCESS FOR RECLAIMING AND RECYCLING SOLID SURFACE

(71) Applicant: DUPONT SAFETY & CONSTRUCTION, INC., Wilmington, DE (US)

(72) Inventor: Keith William Pollak, Buffalo, NY (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 18/947,619

(22) Filed: Nov. 14, 2024

(65) Prior Publication Data

US 2026/0098796 A1     Apr. 9, 2026

Related U.S. Application Data

(60) Provisional application No. 63/704,742, filed on Oct. 8, 2024.

(51) Int. Cl.
    *G01N 23/223*     (2006.01)
    *G01N 15/14*      (2006.01)

(52) U.S. Cl.
    CPC ....... *G01N 15/1468* (2013.01); *G01N 23/223* (2013.01); *G01N 2223/076* (2013.01)

(58) Field of Classification Search
    CPC .... G01N 15/1468; G01N 15/14; G01N 15/10; G01N 15/00; G01N 23/223; G01N 23/22; G01N 23/00; G01N 2223/076; G01N 2223/07; G01N 2223/00
    See application file for complete search history.

(56) References Cited

U.S. PATENT DOCUMENTS

| | | | |
|---|---|---|---|
| 3,847,865 | A | 11/1974 | Duggins |
| 4,085,246 | A | 4/1978 | Buser |
| 9,630,348 | B2 | 4/2017 | Danes et al. |
| 11,193,007 | B2 | 12/2021 | Yoran et al. |
| 11,663,923 | B2 | 5/2023 | Stelmar Netto et al. |
| 2005/0027555 | A1 | 2/2005 | Forrest et al. |
| 2011/0301287 | A1 * | 12/2011 | Weyant ............... B29B 17/0042 264/109 |
| 2019/0284377 | A1 * | 9/2019 | Yoran ...................... C08L 23/12 |
| 2023/0135304 | A1 * | 5/2023 | DeBruin .................. C08J 11/10 526/352 |
| 2024/0043677 | A1 | 2/2024 | Nguyen et al. |

* cited by examiner

*Primary Examiner* — Mohamed Charioui

(57)     ABSTRACT

Processes for reclaiming and recycling solid surface into a desired manufacturer's solid surface manufacturing process and methods used therein; specifically methods for identifying a manufacturing source of a test sample of solid surface comprising an acrylic polymeric matrix and alumina trihydrate (ATH), including generating a reference set of characteristics related to either (1) the percent area covered by the ATH particles, the ATH particle count, and the minor axis length of a best-fit ellipse to ATH particles, or (2) the aluminum, calcium, and zinc concentration in reference samples of solid surface from multiple known manufacturing sources, or some combination of (1) and (2); obtaining the test sample and non-destructively determining certain characteristics of the test sample; comparing those characteristics with the appropriate reference set; and identifying the manufacturing source of the test sample.

14 Claims, No Drawings

PROCESS FOR RECLAIMING AND RECYCLING SOLID SURFACE

BACKGROUND OF THE INVENTION

Field of the Invention This invention relates to methods for reclaiming and recycling solid surface that involve identifying the manufacturing source of the solid surface. This is important, as a manufacturer may desire some assurance that solid surface for recycling that was obtained from downstream partners, customers, and other sources was actually made by the manufacturer's own process. This invention also relates to methods of identifying the manufacturing source of a solid surface without use of any additional chemical tags or markers that have no other purpose than to identify the manufacturer of the solid surface.

Description of Related Art There are many manufacturers of acrylic solid surface, and all of these manufacturers generally use an acrylic thermoset as the polymeric matrix, which is then typically combined with an inorganic filler. Due to the variety of manufacturers of solid surface, it is difficult for a manufacturer to confirm a sample of solid surface of unsure origin is their own, or to otherwise identify the specific manufacturer of samples of solid surface of unsure origin found in the marketplace, at a building site, or downstream partners and customers. The words "unsure origin" are used herein to mean the manufacturing source of a material is unknown or unclear.

One option in such situations is for a manufacturer to add a small quantity of some chemical material to the solid surface to "tag" or "mark" their product, which thereby essentially labels their product with their particular brand. Regulations in certain markets (e.g., food contact, etc.) and cost-sensitivity mean intentionally adding such chemical tags or markers is undesirable. What is needed, therefore, is a method, preferably a method that can be used in the field, of rapidly identifying if a sample of solid surface of unsure origin was made by a desired manufacturer.

BRIEF SUMMARY OF THE INVENTION

This invention relates to a process for reclaiming and recycling solid surface into a desired manufacturer's solid surface manufacturing process, comprising the steps of:

a) obtaining a test sample of solid surface of unsure origin for potential reclaiming, b) non-destructively determining if the test sample was made by the desired manufacturer; and if so, grinding the test sample of solid surface into reclaimed solid surface particles, c) optionally sieving the reclaimed solid surface particles to obtain a desired particle size fraction of particles, and d) introducing the reclaimed solid surface particles into the desired manufacturer's solid surface manufacturing process as decorative particles to recycle the test sample of solid surface.

This invention also relates to a process for reclaiming and recycling solid surface into a desired manufacturer's solid surface manufacturing process, comprising the steps of:

a) obtaining a test sample of solid surface of unsure origin for potential reclaiming, b) non-destructively determining if the test sample was made by the desired manufacturer; and if so, combining the test sample with other test samples made by that desired manufacturer to form a group of solid surface samples for reclaiming, c) grinding the group of solid surface samples for reclaiming into reclaimed solid surface particles, d) optionally sieving the reclaimed solid surface particles to obtain a desired particle size fraction of particles, and e) introducing the reclaimed solid surface particles into the desired manufacturer's solid surface manufacturing process as decorative particles to recycle the test sample of solid surface.

This invention additionally relates to a method for identifying a manufacturing source of a test sample of solid surface comprising an acrylic polymeric matrix and alumina trihydrate (ATH), wherein the method is a first method comprising:

1a) generating an ATH reference set of the percent area covered by ATH particles, ATH particle count, and minor axis length of a best-fit ellipse to ATH particles in reference samples of solid surface obtained from multiple known manufacturing sources;

1b) obtaining the test sample of solid surface to be identified;

1c) non-destructively determining the percent area covered by the ATH particles, the ATH particle count, and the minor axis length of a best-fit ellipse to ATH particles present in the test sample;

1d) comparing the percent area covered by the ATH particles, the ATH particle count, and the minor axis length of a best-fit ellipse to ATH particles present in the test sample with the ATH reference set; and 1e) identifying the manufacturing source of the test sample.

This invention additionally relates to a method for identifying a manufacturing source of a test sample of solid surface comprising an acrylic polymeric matrix and alumina trihydrate (ATH), wherein the method is a second method comprising:

2a) generating an aluminum, calcium, and zinc mass reference set of aluminum, calcium, and zinc concentration by weight in solid surface obtained from reference samples of solid surface from multiple known manufacturing sources;

2b) obtaining the test sample of solid surface to be identified;

2c) non-destructively determining aluminum, calcium, and zinc concentration by weight present in the test sample;

2d) comparing the aluminum, calcium, and zinc concentration by weight present in the test sample with the aluminum, calcium, and zinc mass reference set; and 2e) identifying the manufacturing source of the test sample.

This invention further relates to a method for identifying a manufacturing source of a test sample of solid surface comprising an acrylic polymeric matrix and alumina trihydrate (ATH), wherein all or parts of the first method and the second method are combined; and to a process for reclaiming and recycling solid surface into a desired manufacturer's solid surface manufacturing process that utilizes said combination of all or parts of the first method and the second method.

DETAILED DESCRIPTION OF THE INVENTION

This invention is directed to recycling polymeric solid surface material, such as alumina trihydrate-filled cross-linked acrylic material. A manufacturer can ensure any potentially recyclable polymeric solid surface material was truly made by their process by maintaining tight watch over sales of solid surface and limiting reclamation of scrap to only select value chain partners and end-of-life (EOL) installations.

For example, acrylic solid surface material is a thermoset material, and therefore solid surface cannot be recycled by re-melting. However, during manufacture of the solid surface, any off-spec solid surface production has been recycled back into the solid surface manufacturing process by grinding the off-spec material into particles that are then added back into the solid surface formulation as decorative particles. Since this off-spec solid surface material is known to come directly from the manufacturing process, the manufacturer has no concerns about its authenticity.

Likewise, the manufacturers of solid surface who are intent on further reducing landfill waste, can make agreements and arrangements with their downstream solid surface fabricators and other value-chain partners to capture and segregate their scraps of the manufacturer's solid surface for recycling as decorative particles back into the solid surface manufacturer's manufacturing process. Again, there are no concerns about the authenticity of the waste solid surface because the recycling process is tightly controlled and managed.

However, as a recycle program expands, a manufacturer can desire to obtain solid surface from unlimited sources (i.e., any value chain partner, any end-of-life installation), but then desire to only reuse the manufacturer's own solid surface back into the manufacturer's manufacturing process. In-kind competitive solid surface products could enter the recovery stream, so there is a need to identify one's alumina trihydrate (ATH)-filled crosslinked acrylic solid surface from a pool of others' ATH-filled crosslinked acrylics. This challenge is unlike typical material characterizations that simply want to identify one grade of plastic from another (e.g., PET from HDPE).

One commercially available option for verifying the brand, or the source of manufacture, would be to include an additional easily identifiable chemical "fingerprint" (e.g., IR "tag") in the acrylic matrix. While effective, this chemical would add costs and might risk code and regulatory compliance, or risk compromising immutable product attributes like colorfastness. A preferred method would detect inherent characteristics in the alumina trihydrate-filled crosslinked acrylic material without resorting to any chemical or other material being added to the acrylic material for the sole purpose of identifying the manufacturer.

The solid surface preferably comprises acrylic resin and filler. The resin is preferably based on polymethylmethacrylate (PMMA). Combinations of polymethylmethacrylate and unsaturated polyester also have utility. Typically, the solid surface preferably comprises 30 to 80 volume percent resin and from 20 to 70 volume percent inorganic filler particles, which are preferably distributed evenly throughout the resin and the solid surface. PMMA arises from the polymerization of methyl methacrylate. Other comonomers and/or crosslinkers are often added to the resin to impart particular properties to the final product. Alumina trihydrate is a preferred inorganic filler, but others like quartz may be an additional component of the solid surface. If desired, the majority or all of the inorganic filler can be alumina trihydrate. Additional materials may be added to the resin/filler mixture to impart particular aesthetics. Examples of such additives include pigments, crushed solid surface particles, metal particles, or mica. These synthetic resins/filler mixtures can be cast or molded, and then cured to produce a sheet structure suitable for use as a solid structure in countertops, walls, tiles, etc.; or to produce 3D articles of solid surface, such as sinks, lavatories, bathtubs, shower pans, etc. Exemplary polymeric solid surfaces are available under the tradenames CORIAN®, HI-MACS®, WILSONART®, STARON®, KRION®, or AVONITE®.

Processes for Reclaiming and Recycling

In one embodiment, the process for reclaiming and recycling solid surface into a desired manufacturer's solid surface manufacturing process, comprises the steps of:

a) obtaining a test sample of solid surface of unsure origin for potential reclaiming, b) non-destructively determining if the test sample was made by the desired manufacturer; and if so, grinding the test sample of solid surface into reclaimed solid surface particles, c) optionally sieving the reclaimed solid surface particles to obtain a desired particle size fraction of particles, and d) introducing the reclaimed solid surface particles into the desired manufacturer's solid surface manufacturing process as decorative particles to recycle the test sample of solid surface.

One or more samples of solid surface of unsure origin for potential reclaiming can be obtained from many different sources. Such sources could include do-it-yourselfers, work-sites, various home and office contractors, and demolition companies, along with any source that could be using any one of the various solid surface products on the market.

Determining if the sample was made by a desired manufacturer is accomplished in a non-destructive manner. The words "non-destructive" and "non-destructively" are considered to have their common meaning, which is information about a material is obtained without appreciably altering, damaging, or destroying the material itself. Preferred non-destructive methods include those that either analyze the visual appearance of the sample or analyze the sample's reaction to radiation of various types. In some embodiments, the non-destructive methods include those described in detail in the First Method, Second Method, and Combined First and Second Methods sections provided herein; and if desired, more than one non-destructive method can be used in this process. In some instances, it is desirable that the non-destructive method include the use of one or more hand-held digital or electronic devices that can scan or otherwise analyze samples of solid surface in the field.

If the sample of solid surface of unsure origin is determined to come from the desired manufacturer, the sample is then preferably ground to form reclaimed solid surface particles for recycling into new solid surface as reclaimed decorative particles in that desired manufacturer's process.

Solid surface of unsure origin, that is determined to come from a particular manufacturer by using the processes disclosed herein, is considered "reclaimed solid surface" herein. Further, by use of the adjective "reclaimed" herein with regards to "reclaimed solid surface particles" or "reclaimed decorative particles", it is meant these solid surface particles or decorative particles were made from solid surface of unsure origin that was determined to come from a particular manufacturer by using the processes disclosed herein.

The sample of solid surface of the desired manufacturer can be ground into particles via many different types of size-reduction equipment, including such equipment as hammer mills, disk mills, roll mills, and the like. If desired, various pieces of equipment can be used to size-reduce larger-sized samples of the solid surface into sizes suitable for grinding in the mill.

If desired, the reclaimed ground particles of solid surface can then be optionally sieved to obtain a desired particle size fraction for use in the manufacturing process. Any industrial method of sieving particles using screens can be used to classify the reclaimed solid surface particles into various size distributions. A typical method of sieving particles uses a column of sieve trays of wire mesh screens of a graded mesh size. The particles to be classified are poured onto the top sieve tray which has the largest screen openings. Each lower sieve tray in the column has smaller openings than the one above. The column of sieves trays is typically placed in a mechanical shaker, which shakes all the sieve trays in the column to facilitate movement of the particles on the surface of each mesh screen in each tray so that particles small enough to fit through the screen openings can fall through to the next sieve tray by gravity. After the shaking is complete, the particles remaining on each mesh screen of each sieve tray have a particle size too large to pass through the openings in that mesh screen. Therefore, the sieving process preferably takes a distribution of particle sizes and separates those particles into certain size cuts of each particle size, each size cut having a size distribution that passes through a mesh screen having larger openings but not passing through a mesh screen having smaller openings.

Additionally, prior to grinding, a number of samples of reclaimed solid surface of a certain color or color family can be grouped together and then ground together to form a supply of ground reclaimed solid surface particles of a certain color or color family.

The reclaimed solid surface is therefore introduced into the desired manufacturer's solid surface manufacturing process as reclaimed decorative particles. A typical process for making solid surface can preferably combine an acrylic syrup of poly(methyl methacrylate) (PMMA) dissolved in methyl methacrylate (MMA), inorganic filler particles, and decorative particles. Preferably, the inorganic filler particles are particles of alumina trihydrate (ATH). Preferably, the decorative particles are ground solid surface particles, that in turn preferably comprise PMMA and ATH.

The three components—acrylic syrup, inorganic filler particles, and decorative particles—normally along with any number of other desirable additives such as pigments, are formed into a castable composition having a kinematic viscosity in the range of 900 to 4500 centipoise. The castable composition is then cast onto a smooth surface or poured into a mold and then cured, optionally in an oven, to provide a slab or shaped article of solid surface. The cured solid surface slab or article can be further processed (e.g., trimming edges and polishing the surface) as desired to make a finished solid surface material, such as a panel or other article. Representative teachings of various ways to make solid surface are further described in U.S. Pat. No. 3,847,865 to Duggins or U.S. Pat. No. 4,085,246 to Buser et al.

Of the three primary solid surface components of acrylic syrup, inorganic filler, and decorative particles, the decorative particle component can include reclaimed decorative particles that are particles of ground reclaimed solid surface. Typically, the total decorative particle component can make up as much as 30 weight percent of total weight of the three components (acrylic syrup, inorganic filler, and decorative particles), and preferably the decorative particle component is 5 to 25 weight percent of those three components. If the decorative particles make up more than 30 weight percent of the three components, the composition can have a very high viscosity and will require special attention when flowing and settling. The percentage weight of the three primary solid surface components in the cured solid surface is the same as in the castable composition. The curing of the solid surface, however, does reduce the volume of the castable composition by about 8 percent.

As stated previously, the decorative particle component can comprise the reclaimed decorative particles obtained from the reclaimed solid surface. In some embodiments, it is desirable for 30 to 100 weight percent of the decorative particle component to be reclaimed decorative particles obtained from the reclaimed solid surface.

This invention also relates to a process for reclaiming and recycling solid surface into a desired manufacturer's solid surface manufacturing process, comprising the steps of:
  a) obtaining a test sample of solid surface of unsure origin for potential reclaiming,
  b) non-destructively determining if the test sample was made by the desired manufacturer; and if so, combining the test sample with other test samples made by that desired manufacturer to form a group of solid surface samples for reclaiming,
  c) grinding the group of solid surface samples for reclaiming into reclaimed solid surface particles,
  d) optionally sieving the reclaimed solid surface particles to obtain a desired particle size fraction of particles, and
  e) introducing the reclaimed solid surface particles into the desired manufacturer's solid surface manufacturing process as decorative particles to recycle the test sample of solid surface.

All of the elements and features discussed for the previous embodiment of a method for reclaiming and recycling solid surface into a desired manufacturer's solid surface manufacturing process can apply in this embodiment of the process; wherein step b), if after confirmation the test sample was made by the desired manufacturer and prior to grinding of the test sample, the test sample can be combined with other test samples made by that desired manufacturer to form a group of solid surface samples for reclaiming. This is then followed by a step of grinding the group of solid surface sample for reclaiming into reclaimed solid surface particles.

From a practical standpoint, it is likely a manufacturer attempting to recycle solid surface will obtain caches of samples solid surface of unsure origin, perhaps from multiple sources. It is more efficient to determine the manufacturer of each sample, and then group them by manufacturer, so that samples from the desired manufacturer are further ground and recycled, and the remaining samples perhaps returned to their original manufacturer(s).

The group of reclaimed solid surface samples from the desired manufacturer can then be efficiency ground in step c) to make reclaimed solid surface particles, and optionally sieved if desired to obtain a certain particle size. This forms a supply of reclaimed solid surface particles for introduction into the manufacturer's solid surface manufacturing process as decorative particles to recycle the test sample of solid surface.

The inventions herein further relate to methods for identifying a manufacturing source of a test sample of solid surface comprising an acrylic polymeric matrix and alumina trihydrate filler, including generating a reference set related to parameters that are either, in a first method, related to the combination of the percent area covered by the ATH particles, the ATH particle count, and the minor axis length of a best-fit ellipse to ATH particles in reference samples of solid surface; or in a second method, related to aluminum, calcium, and zinc concentration in reference samples of solid surface; wherein the reference samples of solid surface were obtained from multiple known manufacturing sources;

obtaining and non-destructively determining certain characteristics present in the test sample, and comparing those characteristics with the appropriate reference set to identify the manufacturing source of the test sample. The two methods can be used separately or can be combined.

First Method

In some embodiments, this invention relates to a method for identifying a manufacturing source of a test sample of solid surface comprising an acrylic polymeric matrix and alumina trihydrate (ATH), wherein the method is a first method comprising:

1a) generating an ATH reference set of the percent area covered by the ATH particles, the ATH particle count, and the minor axis length of a best-fit ellipse to ATH particles in solid surface obtained from reference samples of solid surface from multiple known manufacturing sources;

1b) obtaining the test sample of solid surface to be identified;

1c) non-destructively determining the percent area covered by the ATH particles, the ATH particle count, and the minor axis length of a best-fit ellipse to ATH particles present in the test sample;

1d) comparing the percent area covered by the ATH particles, the ATH particle count, and the minor axis length of a best-fit ellipse to ATH particles present in the test sample with the alumina trihydrate reference set; and 1e) identifying the manufacturing source of the test sample.

In this first method, in some specific embodiments, step 1a) can comprise:

1a.i) collecting a set of reference samples of solid surface from known manufacturing sources, 1a.ii) recording microscopic morphology images of each reference sample using x-ray or ultrasound tomography, and 1a.iii) determining the percent area covered by the ATH particles, the ATH particle count, and the minor axis length of a best-fit ellipse to ATH particles in each reference sample from said images, and 1a.iv) generating a predictive statistical model based on the set of reference samples, by correlating the percent area covered by the ATH particles, the ATH particle count, and the minor axis length of a best-fit ellipse to ATH particles from all of the reference samples with their respective known manufacturing sources, to form the ATH reference set.

In this method, the variables that correlated with manufacturing site were discovered by partitioning measurements from the image analysis using decision tree methodology. Then only the variables with statistically significant correlations were used in a full factorial analysis to make the predictive model.

The step 1a.iii) of determining the percent area covered by the ATH particles, the ATH particle count, and the minor axis length of a best-fit ellipse to ATH particles in each reference sample from microscopic morphology images of each reference sample can be done by digitally analyzing the microscopic morphology images obtained using x-ray or ultrasound tomography. For example, the tomography results can be outputted as digital images; and software, such as ImageJ, can be used to measure features of those images. ImageJ is an open-source Java-based image processing program developed at the National Institutes of Health and the Laboratory for Optical and Computational Instrumentation (LOCI, University of Wisconsin). Specifically, measurements can be made for the ATH particles that are visible in the image, including for example the ATH particle count, the total area and percent area occupied by ATH particles, the range of perimeters of the particles, the range of major and minor axis length of a best-fit ellipse of the particles, the particle aspect ratio, and the circularity of the individual particles. The data collected in step 1a.iii) can then be used to generate the statistical model in step 1a.iv) that correlates each reference sample to a known manufacturing source based on ATH particle criteria. Specifically, the statistical model uses the ATH particle measurements and data along with respective known manufacturing sites, which are statistically partitioned using decision tree methodology. It has been found that measurements of the percent area covered by the ATH particles, the ATH particle count, and the minor axis length of a best-fit ellipse to ATH particles most strongly correlate with the manufacturing site. These three variables can be used in a Full Factorial Design to generate the (predictive mathematical) statistical model.

For example, in a tomography image, the ATH particles appear as light gray areas in a darker field that is the poly(methyl methacrylate) matrix resin. The "percent area covered by ATH" is the percentage area of the entire tomography image that is light gray. The "ATH particle count" is the number of ATH particles in the tomography image. The "minor axis length of a best-fit ellipse to ATH particles" is a geometric measurement, best made by the tomography image software. An ellipse is fitted to each particle. The longer length axis of the ellipse is called the major axis, and the shorter length axis of the ellipse is the minor axis. It was found that the minor axis length of the best-fit ellipse was a reliable indicator of the desired manufacturer. By "best-fit ellipse" it is meant the ellipse that most closely encloses the shape of the ATH particle, which can be determined according to a least squares criterion that solves for the ellipse parameters that result in the ellipse with the smallest overall error from the shape of the ATH particle. The preferred tomographic image area for these measurements is 3.8 mm$^2$ viewed at 4× magnification at a resolution of 1 micron.

In this first method, in some embodiments, the step 1c) of non-destructively determining percent area covered by the ATH particles, ATH particle count, and minor axis length of a best-fit ellipse to ATH particles present in the test sample can comprise:

1c.i) recording microscopic morphology of each test sample using x-ray or ultrasound tomography, and 1c.ii) determining the percent area covered by the ATH particles, the ATH particle count, and the minor axis length of a best-fit ellipse to ATH particles in the test sample.

The step 1c.ii) of determining the percent area covered by the ATH particles, the ATH particle count, and the minor axis length of a best-fit ellipse to ATH particles in each test sample from microscopic morphology images of each test sample can essentially repeat the various possible embodiments of step 1a.iii). Specifically, digital microscopic images of the test sample can be recorded via tomography. Using each ATH particles visible in the image, the percent area covered by the ATH particles, the ATH particle count, and the minor axis length of a best-fit ellipse to ATH particles in the test samples can be analyzed and measured using software like ImageJ. In some instances, it can be desirable that the digital microscopic images of the test sample be obtained by use of one or more hand-held digital or electronic devices that can scan or otherwise analyze the test sample of solid surface in the field.

In this first method, in some embodiments, step 1d) of comparing the percent area covered by the ATH particles, the ATH particle count, and the minor axis length of a best-fit ellipse to ATH particles present in the test sample with the ATH reference set, can be accomplished by entering the percent area covered by the ATH particles, the ATH particle count, and the minor axis length of a best-fit ellipse to ATH particles measurements of the test samples into the predictive model, and determining the probability the test sample was produced by one of the known manufacturing sources in the ATH reference set.

Finally, step 1e) of identifying the manufacturing source of the test sample can be in the form of a digital output to a viewing device, hardcopy report, or some verbal or auditory signal of the most likely manufacturing source for the test sample obtained from step 1d). This output can be in many different forms and could include a listing of probabilities the test sample originated from a number of different known manufacturing sources, based on the previously derived statistical model.

Second Method

In some embodiments, this invention relates to a method for identifying a manufacturing source of a test sample of solid surface comprising an acrylic polymeric matrix and alumina trihydrate (ATH), wherein the method is a second method comprising:

2a) generating an aluminum, calcium, and zinc mass reference set of aluminum, calcium, and zinc concentration by weight in solid surface obtained from reference samples of solid surface from multiple known manufacturing sources;

2b) obtaining the test sample of solid surface to be identified;

2c) non-destructively determining aluminum, calcium, and zinc concentration by weight present in the test sample;

2d) comparing the aluminum, calcium, and zinc concentration by weight present in the test sample with the aluminum, calcium, and zinc mass reference set; and 2e) identifying the manufacturing source of the test sample.

In this second method, in some embodiments, step 2a) can comprise:

2a.i) collecting a set of reference samples of solid surface from known manufacturing sources, 2a.ii) determining aluminum, calcium, and zinc concentration by weight in each reference sample using x-ray fluorescence, and 2a.iv) generating an aluminum, calcium, and zinc mass reference set in the form of a predictive statistical model using the elemental concentrations of aluminum, calcium, and zinc in each reference sample and the known manufacturing site of each reference sample.

In this second method, the variables that correlated with manufacturing site were discovered using a k-fold neural network with three hidden nodes. Then only the variables with statistically significant correlations were used in a full factorial analysis to make the predictive model. The relative concentrations of aluminum, calcium, and zinc in each solid surface sample were found to correlate with the manufacturing site.

In this second method, in some embodiments, step 2c) of non-destructively determining aluminum, calcium, and zinc concentration by weight present in the test sample can be determined by using x-ray fluorescence. In some instances, it can be desirable that this determination be obtained by use of one or more hand-held digital or electronic devices that can scan or otherwise analyze the test sample of solid surface in the field.

In this second method, in some embodiments, step 2d) of comparing aluminum, calcium, and zinc concentration by weight present in the test sample with the aluminum, calcium, and zinc mass reference set can be accomplished by inputting the relative concentrations of aluminum, calcium, and zinc from each solid surface sample into the predictive statistical model. The predictive statistical model can then determine the probability each test sample was produced by one of the known manufacturing sources in the aluminum, calcium, and zinc mass reference set.

Finally, step 2e) of identifying the manufacturing source of the test sample can be in the form of a digital output to a viewing device, hardcopy report, or some verbal or auditory signal of the most likely manufacturing source for the test sample obtained from step 2d). This output can be in many different forms and could include a listing of probabilities the test sample originated from a number of different known manufacturing sources, based on the previously derived statistical model.

Combined First and Second Methods

In some embodiments, the manufacturing source of a test sample of solid surface can be identified by use of a combination of the first method and the second method. Specifically, this said combined first and second method can relate to a method for identifying a manufacturing source of a test sample of solid surface comprising an acrylic polymeric matrix and alumina trihydrate (ATH), wherein the manufacturing source of the test sample is identified by the use of the aforementioned steps 1a) to 1d) of the first method, which could include the possible steps (i, ii, etc.) that those steps might comprise, as previously discussed; combined with the aforementioned steps 2a) to 2d) of the second method, which could include the possible steps (i, ii, etc.) that those steps might comprise, as previously discussed. The final step of identifying the manufacturing source of the test sample can be in the form of a digital output to a viewing device, hardcopy report, or some verbal or auditory signal of the most likely manufacturing source, as determined by the combination of methods.

Using a combination of the two methods is believed to further improve the reliability of identifying the manufacturing source. While each of the two methods have been shown they can provide accurate results, it is believed that since statistical models are used in each of the methods, the combination of the two methods could reduce the potential for errors and therefore more reliably identify the manufacturing source.

Additionally, combining the first method with the second method can result in a reduction in the number of parameters needed to identify the manufacturing source of a test sample of solid surface of unsure origin. For example, in some embodiments when the first method is combined with the second method, it has been found that only one of the three parameters of the first method (i.e., of the percent area covered by the ATH particles, the ATH particle count, and the minor axis length of a best-fit ellipse to ATH particles), and only one of the three parameters of the second method (i.e., aluminum, calcium, and zinc concentration by weight) are needed to identify the manufacturer of a sample of solid surface of unsure origin.

In some specific embodiments when the first method is combined with the second method, the determination of the manufacturer of a test sample of solid surface of unsure origin can be accomplished by use of only the minor axis length of the best fit ellipse (from the XRT image analyses of the first method) with only the calcium concentration by weight (from XRF measurements of the second method). It is believed other such combinations are possible.

EXAMPLES

A total of 38 samples of alumina trihydrate (ATH)-filled acrylic solid surface were collected from a control (desired) manufacturer and 6 other manufacturers.

Example 1

A ZEISS® Xradia Versa® 510 X-Ray Microscope was used to record digital images from 10 random locations on each sample. The image area was 3.8 mm² viewed at 4× magnification at a resolution of 1 micron. The particle shapes and sizes in those images were analyzed using ImageJ, with the following parameters were recorded for each visible ATH:

ATH Particle Count (The quantity of ATH particles)

Percent Area covered by ATH Particles

ATH Particle Size

ATH Particle Perimeter

Major axis length of a best-fit ellipse to ATH particles

Minor axis length of a best-fit ellipse to ATH particles

ATH Particle Circularity

ATH Particle Solidity

All of the recorded parameters were statistically partitioned using decision tree methodology to identify the specific parameters that correlated with a particular manufacturing site. Three parameters were found to significantly correlate with the control (desired) manufacturing site: the percent area covered by the ATH particles, the ATH particle count, and the minor axis length of a best-fit ellipse to ATH particles. These three specific parameters were then used to make a full factorial predictive statistical model (primary effects and interaction effects) that could predict the likelihood a specimen of solid surface of unsure origin was made by the desired manufacturer.

The percent area covered by the ATH particles, the ATH particle count, and the minor axis length of a best-fit ellipse to ATH particles were collected from two test samples, one made by the desired manufacturer and the other made by another manufacturer. The predictive model assigned a 100% likelihood that the sample made by the desired manufacturer came from the desired manufacturer; and the model assigned a 0% likelihood that the data collected from the other sample was made by the desired manufacturer.

Example 2

A Niton™ XL3t GOLDD X-Ray Fluorescence Spectrophotometer was used to measure elemental abundances from 3 random locations on each sample. Abundances of the following elements were recorded: Al, Ca, Mg, P, S, Si, and Zn. The entire pool of data was statistically analyzed with a k-fold neural network with three hidden nodes; using three equal-size groups (two for training and one for validation), with the analysis repeated until each group had been held. The relative amounts of three elements were found to significantly correlate with the control (desired) manufacturer: aluminum, calcium, and zinc.

These three parameters were then used to make a full factorial (primary effects and interaction effects) statistical model that could predict the likelihood a specimen of solid surface of unsure origin was made by the desired manufacturer.

The abundances of Al, Zn, and Ca were collected from two test samples, one made by the desired manufacturer and one made by another manufacturer. The predictive model assigned a 100% likelihood that the sample made by the desired manufacturer came from the desired manufacturer; and the model assigned a 0% likelihood that the data collected from the other sample was made by the desired manufacturer.

Example 3

Data from the ten XRT images were averaged for each sample in Example 1. These averages were paired with the XRF data from the respective sample in Example 2. A linear stepwise regression of the pooled data showed two variables to significantly correlate with the control (desired) manufacturer: the minor axis length of the best fit ellipse (from XRT image analyses) and calcium concentration (from XRF measurements). These two parameters were then used to make a full factorial (primary effects and interaction effects) statistical model that could predict the likelihood a specimen of solid surface of unsure origin was made by the desired manufacturer. The minor axis length of the best fit ellipse and calcium concentration were measured from two test samples, one made by the desired manufacturer, and one made by another manufacturer. The predictive model assigned a 100% likelihood that the sample made by the desired manufacturer came from the desired manufacturer; and the model assigned a 0% likelihood that the data collected from the other sample was made by the desired manufacturer.

The invention claimed is:

1. A process for reclaiming and recycling solid surface into a desired manufacturer's solid surface manufacturing process, comprising the steps of:
   a) obtaining a test sample of solid surface of unsure origin for potential reclaiming,
   b) non-destructively determining that the test sample was made by the desired manufacturer; and grinding the test sample of solid surface into reclaimed solid surface particles,
   c) optionally sieving the reclaimed solid surface particles to obtain a desired particle size fraction of particles, and
   d) introducing the reclaimed solid surface particles into the desired manufacturer's solid surface manufacturing process as decorative particles to recycle the test sample of solid surface.

2. The process of claim 1, wherein the method for non-destructively determining that the test sample was made by the desired manufacturer of step b) comprises a first method comprising:
   1a) generating an alumina trihydrate (ATH) reference set of percent area covered by the ATH particles, ATH particle count, and minor axis length of a best-fit ellipse to ATH particles in reference samples of solid surface obtained from multiple known manufacturing sources;
   1b) obtaining the test sample of solid surface to be identified;
   1c) non-destructively determining the percent area covered by the ATH particles, the ATH particle count, and the minor axis length of a best-fit ellipse to ATH particles present in the test sample;
   1d) comparing the percent area covered by the ATH particles, the ATH particle count, and the minor axis length of a best-fit ellipse to ATH particles present in the test sample with the ATH reference set; and 1e) identifying the manufacturing source of the test sample.

3. The process of claim 2, wherein 1a) of the first method comprises:

1a.i) collecting a set of reference samples of solid surface from known manufacturing sources, 1a.ii) recording microscopic morphology images of each reference sample using x-ray or ultrasound tomography, and 1a.iii) determining the percent area covered by the ATH particles, the ATH particle count, and the minor axis length of a best-fit ellipse to ATH particles in each reference sample from said images, and 1a.iv) generating a statistical model based on the set of reference samples, by correlating the percent area covered by the ATH particles, the ATH particle count, and the minor axis length of a best-fit ellipse to ATH particles from all of the reference samples with their respective manufacturing sources, to form the ATH reference set; or wherein 1c) of the first method comprises:

1c.i) recording microscopic morphology of each test sample using x-ray or ultrasound tomography, and 1c.ii) determining the percent area covered by the ATH particles, the ATH particle count, and the minor axis length of a best-fit ellipse to ATH particles in the test sample; or wherein 1d) of the first method further comprises:

1d.i) after comparing the percent area covered by the ATH particles, the ATH particle count, and the minor axis length of a best-fit ellipse to ATH particles in the test sample with the ATH reference set, determining the probability the test sample was produced by one of the manufacturing sources in the alumina trihydrate reference set.

4. The process of claim 1, wherein the method for non-destructively determining that the test sample was made by the desired manufacturer of step b) comprises a second method comprising:

2a) generating an aluminum, calcium, and zinc mass reference set of aluminum, calcium, and zinc concentration by weight in solid surface obtained from reference samples of solid surface from multiple known manufacturing sources;

2b) obtaining the test sample of solid surface to be identified;

2c) non-destructively determining aluminum, calcium, and zinc concentration by weight present in the test sample;

2d) comparing aluminum, calcium, and zinc concentration by weight present in the test sample with the aluminum, calcium, and zinc mass reference set; and 2e) identifying the manufacturing source of the test sample.

5. The process of claim 4, wherein 2a) of the second method comprises:

2a.i) collecting a set of reference samples of solid surface from known manufacturing sources, 2a.ii) recording the fluorescent intensity of aluminum, calcium, and zinc in each reference sample using x-ray fluorescence, and 2a.iii) determining aluminum, calcium, and zinc concentration by weight in each reference sample from said intensity, and 2a.iv) generating a statistical model based on the set of reference samples, by correlating the concentration of aluminum, calcium, and zinc by weight from all of the reference samples with their respective manufacturing sources, to form the aluminum, calcium, and zinc mass reference set; or wherein 2c) of the second method comprises:

2c.i) recording the fluorescent intensity of aluminum, calcium, and zinc in each test sample using x-ray fluorescence, and 2c.ii) determining the concentration of aluminum, calcium, and zinc by weight in the test sample from said intensity; or wherein 2d) of the second method comprises:

2d.i) after comparing aluminum, calcium, and zinc concentration by weight in the test sample with the aluminum, calcium, and zinc mass reference set, determining the probability the test sample was produced by one of the manufacturing sources in the aluminum, calcium, and zinc mass reference set.

6. The process of claim 1, wherein the method for non-destructively determining that the test sample was made by the desired manufacturer of step b) comprises a combination of a first method and a second method, wherein the first method comprises:

1a) generating an alumina trihydrate (ATH) reference set of percent area covered by the ATH particles, ATH particle count, and minor axis length of a best-fit ellipse to ATH particles in reference samples of solid surface obtained from multiple known manufacturing sources;

1b) obtaining the test sample of solid surface to be identified;

1c) non-destructively determining the percent area covered by the ATH particles, the ATH particle count, and the minor axis length of a best-fit ellipse to ATH particles present in the test sample;

1d) comparing the percent area covered by the ATH particles, the ATH particle count, and the minor axis length of a best-fit ellipse to ATH particles present in the test sample with the ATH reference set; and 1e) identifying the manufacturing source of the test sample;

wherein 1a) of the first method comprises:

1a.i) collecting a set of reference samples of solid surface from known manufacturing sources, 1a.ii) recording microscopic morphology images of each reference sample using x-ray or ultrasound tomography, and 1a.iii) determining the percent area covered by the ATH particles, the ATH particle count, and the minor axis length of a best-fit ellipse to ATH particles in each reference sample from said images, and 1a.iv) generating a statistical model based on the set of reference samples, by correlating the percent area covered by the ATH particles, the ATH particle count, and the minor axis length of a best-fit ellipse to ATH particles from all of the reference samples with their respective manufacturing sources, to form the ATH reference set; or wherein 1c) of the first method comprises:

1c.i) recording microscopic morphology of each test sample using x-ray or ultrasound tomography, and 1c.ii) determining the percent area covered by the ATH particles, the ATH particle count, and the minor axis length of a best-fit ellipse to ATH particles in the test sample; or wherein 1d) of the first method further comprises:

1d.i) after comparing the percent area covered by the ATH particles, the ATH particle count, and the minor axis length of a best-fit ellipse to ATH particles in the test sample with the ATH reference set, determining the probability the test sample was produced by one of the manufacturing sources in the alumina trihydrate reference set; and wherein the second method comprises 2a) generating an aluminum, calcium, and zinc mass reference set of aluminum, calcium, and zinc concentration by weight in solid surface obtained from reference samples of solid surface from multiple known manufacturing sources;

2b) obtaining the test sample of solid surface to be identified;

2c) non-destructively determining aluminum, calcium, and zinc concentration by weight present in the test sample;

2d) comparing aluminum, calcium, and zinc concentration by weight present in the test sample with the aluminum, calcium, and zinc mass reference set; and 2e) identifying the manufacturing source of the test sample;

wherein 2a) of the second method comprises:

2a.i) collecting a set of reference samples of solid surface from known manufacturing sources, 2a.ii) recording the fluorescent intensity of aluminum, calcium, and zinc in each reference sample using x-ray fluorescence, and 2a.iii) determining aluminum, calcium, and zinc concentration by weight in each reference sample from said intensity, and 2a.iv) generating a statistical model based on the set of reference samples, by correlating the concentration of aluminum, calcium, and zinc by weight from all of the reference samples with their respective manufacturing sources, to form the aluminum, calcium, and zinc mass reference set; or wherein 2c) of the second method comprises:

2c.i) recording the fluorescent intensity of aluminum, calcium, and zinc in each test sample using x-ray fluorescence, and 2c.ii) determining the concentration of aluminum, calcium, and zinc by weight in the test sample from said intensity; or wherein 2d) of the second method comprises:

2d.i) after comparing aluminum, calcium, and zinc concentration by weight in the test sample with the aluminum, calcium, and zinc mass reference set, determining the probability the test sample was produced by one of the manufacturing sources in the aluminum, calcium, and zinc mass reference set.

7. The process of claim 6, wherein steps 1a) to 1d) of the first method are accomplished using only one of the percent area covered by the ATH particles, the ATH particle count, and the minor axis length of a best-fit ellipse to ATH particles;

and steps 2a) to 2d) are accomplished using only one of the aluminum, calcium, zinc concentration by weight.

8. The process of claim 1, wherein in step b), the test sample made by the desired manufacturer is combined with other test samples made by that desired manufacturer to form a group of solid surface samples for reclaiming, followed by grinding the group of solid surface samples for reclaiming into reclaimed solid surface particles.

9. The process of claim 8, wherein the method for non-destructively determining that the test sample was made by the desired manufacturer of step b) comprises a first method comprising:

1a) generating an alumina trihydrate (ATH) reference set of percent area covered by the ATH particles, ATH particle count, and minor axis length of a best-fit ellipse to ATH particles in reference samples of solid surface obtained from multiple known manufacturing sources;

1b) obtaining the test sample of solid surface to be identified;

1c) non-destructively determining the percent area covered by the ATH particles, the ATH particle count, and the minor axis length of a best-fit ellipse to ATH particles present in the test sample;

1d) comparing the percent area covered by the ATH particles, the ATH particle count, and the minor axis length of a best-fit ellipse to ATH particles present in the test sample with the ATH reference set; and 1e) identifying the manufacturing source of the test sample.

10. The process of claim 9, wherein 1a) of the first method comprises:

1a.i) collecting a set of reference samples of solid surface from known manufacturing sources, 1a.ii) recording microscopic morphology images of each reference sample using x-ray or ultrasound tomography, and 1a.iii) determining the percent area covered by the ATH particles, the ATH particle count, and the minor axis length of a best-fit ellipse to ATH particles in each reference sample from said images, and 1a.iv) generating a statistical model based on the set of reference samples, by correlating the percent area covered by the ATH particles, the ATH particle count, and the minor axis length of a best-fit ellipse to ATH particles from all of the reference samples with their respective manufacturing sources, to form the ATH reference set; or wherein 1c) of the first method comprises:

1c.i) recording microscopic morphology of each test sample using x-ray or ultrasound tomography, and 1c.ii) determining the percent area covered by the ATH particles, the ATH particle count, and the minor axis length of a best-fit ellipse to ATH particles in the test sample; or wherein 1d) of the first method further comprises:

1d.i) after comparing the percent area covered by the ATH particles, the ATH particle count, and the minor axis length of a best-fit ellipse to ATH particles in the test sample with the ATH reference set, determining the probability the test sample was produced by one of the manufacturing sources in the alumina trihydrate reference set.

11. The process of claim 8, wherein the method for non-destructively determining that the test sample was made by the desired manufacturer of step b) comprises a second method comprising:

2a) generating an aluminum, calcium, and zinc mass reference set of aluminum, calcium, and zinc concentration by weight in solid surface obtained from reference samples of solid surface from multiple known manufacturing sources;

2b) obtaining the test sample of solid surface to be identified;

2c) non-destructively determining aluminum, calcium, and zinc concentration by weight present in the test sample;

2d) comparing aluminum, calcium, and zinc concentration by weight present in the test sample with the aluminum, calcium, and zinc mass reference set; and 2e) identifying the manufacturing source of the test sample.

12. The process of claim 11,
wherein 2a) of the second method comprises:

2a.i) collecting a set of reference samples of solid surface from known manufacturing sources, 2a.ii) recording the fluorescent intensity of aluminum, calcium, and zinc in each reference sample using x-ray fluorescence, and 2a.iii) determining aluminum, calcium, and zinc concentration by weight in each reference sample from said intensity, and 2a.iv) generating a statistical model based on the set of reference samples, by correlating the concentration of aluminum, calcium, and zinc by weight from all of the reference samples with their respective manufacturing sources, to form the aluminum, calcium, and zinc mass reference set; or wherein 2c) of the second method comprises:

2c.i) recording the fluorescent intensity of aluminum, calcium, and zinc in each test sample using x-ray fluorescence, and 2c.ii) determining the concentration of aluminum, calcium, and zinc by weight in the test sample from said intensity; or wherein 2d) of the second method further comprises:

2d.i) after comparing aluminum, calcium, and zinc concentration by weight in the test sample with the aluminum, calcium, and zinc mass reference set, determining the probability the test sample was produced by one of the manufacturing sources in the aluminum, calcium, and zinc mass reference set.

13. The process of claim 8, wherein the method for non-destructively determining that the test sample was made by the desired manufacturer of step b) comprises a combination of a first method and a second method,
wherein the first method comprises:

1a) generating an alumina trihydrate (ATH) reference set of percent area covered by the ATH particles, ATH particle count, and minor axis length of a best-fit ellipse to ATH particles in reference samples of solid surface obtained from multiple known manufacturing sources;

1b) obtaining the test sample of solid surface to be identified;

1c) non-destructively determining the percent area covered by the ATH particles, the ATH particle count, and the minor axis length of a best-fit ellipse to ATH particles present in the test sample;

1d) comparing the percent area covered by the ATH particles, the ATH particle count, and the minor axis length of a best-fit ellipse to ATH particles present in the test sample with the ATH reference set; and 1e) identifying the manufacturing source of the test sample;

wherein 1a) of the first method comprises:

1a.i) collecting a set of reference samples of solid surface from known manufacturing sources, 1a.ii) recording microscopic morphology images of each reference sample using x-ray or ultrasound tomography, and 1a.iii) determining the percent area covered by the ATH particles, the ATH particle count, and the minor axis length of a best-fit ellipse to ATH particles in each reference sample from said images, and 1a.iv) generating a statistical model based on the set of reference samples, by correlating the percent area covered by the ATH particles, the ATH particle count, and the minor axis length of a best-fit ellipse to ATH particles from all of the reference samples with their respective manufacturing sources, to form the ATH reference set; or wherein 1c) of the first method comprises:

1c.i) recording microscopic morphology of each test sample using x-ray or ultrasound tomography, and 1c.ii) determining the percent area covered by the ATH particles, the ATH particle count, and the minor axis length of a best-fit ellipse to ATH particles in the test sample; or wherein 1d) of the first method further comprises:

1d.i) after comparing the percent area covered by the ATH particles, the ATH particle count, and the minor axis length of a best-fit ellipse to ATH particles in the test sample with the ATH reference set, determining the probability the test sample was produced by one of the manufacturing sources in the alumina trihydrate reference set; and wherein the second method comprises 2a) generating an aluminum, calcium, and zinc mass reference set of aluminum, calcium, and zinc concentration by weight in solid surface obtained from reference samples of solid surface from multiple known manufacturing sources;

2b) obtaining the test sample of solid surface to be identified;

2c) non-destructively determining aluminum, calcium, and zinc concentration by weight present in the test sample;

2d) comparing aluminum, calcium, and zinc concentration by weight present in the test sample with the aluminum, calcium, and zinc mass reference set; and 2e) identifying the manufacturing source of the test sample;

wherein 2a) of the second method comprises:

2a.i) collecting a set of reference samples of solid surface from known manufacturing sources, 2a.ii) recording the fluorescent intensity of aluminum, calcium, and zinc in each reference sample using x-ray fluorescence, and 2a.iii) determining aluminum, calcium, and zinc concentration by weight in each reference sample from said intensity, and 2a.iv) generating a statistical model based on the set of reference samples, by correlating the concentration of aluminum, calcium, and zinc by weight from all of the reference samples with their respective manufacturing sources, to form the aluminum, calcium, and zinc mass reference set; or wherein 2c) of the second method comprises:

2c.i) recording the fluorescent intensity of aluminum, calcium, and zinc in each test sample using x-ray fluorescence, and 2c.ii) determining the concentration of aluminum, calcium, and zinc by weight in the test sample from said intensity; or wherein 2d) of the second method comprises:

2d.i) after comparing aluminum, calcium, and zinc concentration by weight in the test sample with the aluminum, calcium, and zinc mass reference set, determining the probability the test sample was produced by one of the manufacturing sources in the aluminum, calcium, and zinc mass reference set.

14. The process of claim 13, wherein steps 1a) to 1d) of the first method are accomplished using only one of the percent area covered by the ATH particles, the ATH particle count, and the minor axis length of a best-fit ellipse to ATH particles; and steps 2a) to 2d) are accomplished using only one of the aluminum, calcium, zinc concentration by weight.

\* \* \* \* \*